United States Patent
Wolfschluckner et al.

(10) Patent No.: US 12,006,154 B2
(45) Date of Patent: Jun. 11, 2024

(54) LOAD CARRIER FOR LOADING AND UNLOADING A CONTAINER

(71) Applicant: PHS Logistiktechnik GmbH, Graz (AT)

(72) Inventors: Andreas Wolfschluckner, Graz (AT); Matthias Fritz, Graz (AT)

(73) Assignee: PHS Logistiktechnik GmbH, Graz (AT)

(*) Notice: Subject to any disclaimer, the term of this patent is extended or adjusted under 35 U.S.C. 154(b) by 0 days.

(21) Appl. No.: 18/285,301

(22) PCT Filed: Apr. 5, 2022

(86) PCT No.: PCT/EP2022/058948
§ 371 (c)(1),
(2) Date: Oct. 2, 2023

(87) PCT Pub. No.: WO2022/214461
PCT Pub. Date: Oct. 13, 2022

(65) Prior Publication Data
US 2024/0083680 A1    Mar. 14, 2024

(30) Foreign Application Priority Data
Apr. 6, 2021    (EP) .................................... 21166952

(51) Int. Cl.
*B65G 17/06*    (2006.01)
*B65G 17/08*    (2006.01)
(Continued)

(52) U.S. Cl.
CPC ........... *B65G 17/062* (2013.01); *B65G 25/06* (2013.01); *B65G 67/24* (2013.01); *B65G 17/08* (2013.01); *B65G 17/40* (2013.01)

(58) Field of Classification Search
CPC ...... B65G 17/062; B65G 67/20; B65G 17/08; B65G 17/40; B65G 25/06; B65G 67/24
See application file for complete search history.

(56) References Cited

U.S. PATENT DOCUMENTS 2,820,560 A    1/1958    Davis
3,498,482 A    3/1970    Lewis
(Continued)

FOREIGN PATENT DOCUMENTS

| EP | 1 760 032 A2 | 3/2007 |
| EP | 3 061 648 B1 | 4/2018 |
| JP | S61-45834 A | 3/1986 |

OTHER PUBLICATIONS

English translation of the International Search Report and Written Opinion of the International Searching Authority in PCT/EP2022/058948, mailed Aug. 25, 2022.
(Continued)

*Primary Examiner* — Mark A Deuble
(74) *Attorney, Agent, or Firm* — Collard & Roe, P.C.

(57) ABSTRACT

A load carrier for loading and unloading a container includes rigid load-carrier segments, each having a length and width in first and second directions, respectively, and an upper side in a third direction. In a first state, the upper sides are parallel to one another and, in the first direction, one behind the other, to form a planar loading surface. The segments are mutually connected in an articulated manner such that they are pivotable to one another about pivot axes parallel to the second direction. In the first state, a respective segment which, in the first direction, follows a respectively other segment, is pivotable, by its upper side, toward the upper side of the other segments, so that, by the segments being rolled up in spiral form, the load carrier is transferrable from the first into a second state and, by unrolling, is transferrable back into the first state.

15 Claims, 4 Drawing Sheets

(51) Int. Cl.
*B65G 17/40* (2006.01)
*B65G 25/06* (2006.01)
*B65G 67/24* (2006.01)

(56) References Cited

U.S. PATENT DOCUMENTS

| | | | | |
|---|---|---|---|---|
| 3,704,798 | A * | 12/1972 | Carpenture, Jr. | B60P 1/38 |
| | | | | 414/521 |
| 4,162,735 | A * | 7/1979 | Lewis | B60P 1/006 |
| | | | | 414/521 |
| 4,842,471 | A * | 6/1989 | Hodgetts | B65G 35/04 |
| | | | | 414/521 |
| 4,892,456 | A * | 1/1990 | Hodgetts | B65G 67/20 |
| | | | | 410/92 |
| 6,561,746 | B1 * | 5/2003 | Broussard | B60P 3/07 |
| | | | | 414/500 |
| 8,197,175 | B2 * | 6/2012 | Stewart | B60P 1/365 |
| | | | | 414/812 |
| 9,688,317 | B1 * | 6/2017 | Berger | B62D 33/042 |
| 9,738,466 | B2 * | 8/2017 | Pippin | B65G 67/24 |
| 10,392,204 | B2 * | 8/2019 | Kauhanen | B65G 39/20 |
| 11,702,302 | B2 * | 7/2023 | Wilson | B65G 65/005 |
| | | | | 700/230 |

OTHER PUBLICATIONS

International Search Report in PCT/EP2022/058948, mailed Aug. 25, 2022.

\* cited by examiner

Fig. 9

LOAD CARRIER FOR LOADING AND UNLOADING A CONTAINER

CROSS REFERENCE TO RELATED APPLICATIONS

This application is the National Stage of PCT/EP2022/058948 filed on Apr. 5, 2022, which claims priority under 35 U.S.C. § 119 of European Application No. 21166952.8 filed on Apr. 6, 2021, the disclosure of which is incorporated by reference. The international application under PCT article 21(2) was not published in English.

FIELD OF THE INVENTION

The present invention relates to a load carrier for loading and unloading a container, in particular with or from piece goods, comprising rigid load-carrier segments, wherein the load-carrier segments each have an upper side facing in a third direction and a segment length extending in a first direction and a segment width extending in a second direction, wherein the first direction, the second direction and the third direction are disposed mutually normal to one another, wherein, in a first state of the load carrier, the upper sides of the load-carrier segments are arranged substantially parallel to one another and, as seen in the first direction, one behind the other in order to form a substantially planar loading area, wherein the load-carrier segments are connected to one another in an articulated manner such that the load-carrier segments can be pivoted in relation to one another about pivot axes extending parallel to the second direction, wherein, in the first state, a respective one of the load-carrier segments, which, as viewed in the first direction, follows a respectively other one of the load-carrier segments, can be pivoted with its upper side in the direction of the upper side of the other load-carrier segment in order to be able to transfer the load carrier from the first state into a second state by at least sectionally rolling up the load-carrier segments in spiral form, wherein the load carrier can be transferred from the second state into the first state by unrolling.

DESCRIPTION OF THE PRIOR ART

From EP 3061648 B1 a system for unloading objects from a container is known, in which the objects are arranged on a belt covering the bottom of the container. At an unloading bay, the belt together with the objects arranged on it can be pulled out of the container. A disadvantage of this solution is that it is not always sufficiently robust, especially when it is impossible to avoid transport vehicles such as forklifts driving onto the belt and potentially damaging it. Another disadvantage is that for loading or reloading the container, special retraction means must be provided in or on the container in order to be able to pull the belt with items arranged on it into the container, which increases the design effort and thus also costs.

A load carrier for loading and unloading trucks is known from U.S. Pat. No. 2,820,560 A, wherein individual, elongated load-carrier segments are connected in an articulated manner to one another via hinges so that the load-carrier segments can be folded into triangles when they are not needed, which is intended to facilitate handling.

From EP 1760032 A2, a device for loading and unloading containers or the like with pallets is known, wherein flexible links arranged in pairs in parallel are provided, which can be pushed under several pallets arranged one behind the other. The links are hinged together by connecting links and can be wound substantially helically on a polygonal wheel for storage.

OBJECT OF THE INVENTION

It is therefore the object of the present invention to provide a solution for unloading and loading containers which avoids the above-mentioned disadvantages. In particular, the solution according to the invention should be sufficiently mechanically stable and enable loading as well as unloading without increased design effort.

SUMMARY OF THE INVENTION

For solving said object, in a load carrier for loading and unloading a container, comprising rigid load-carrier segments, wherein the load-carrier segments each have an upper side facing in a third direction and a segment length extending in a first direction and a segment width extending in a second direction, wherein the first direction, the second direction and the third direction are disposed mutually normal to one another, wherein, in a first state of the load carrier, the upper sides of the load-carrier segments are arranged substantially parallel to one another, and, as seen in the first direction, one behind the other in order to form a substantially planar loading area, wherein the load-carrier segments are connected to one another in an articulated manner such that the load-carrier segments can be pivoted in relation to one another about pivot axes extending parallel to the second direction, wherein, in the first state, a respective one of the load-carrier segments, which, as viewed in the first direction, follows a respectively other one of the load-carrier segments, can be pivoted with its upper side in the direction of the upper side of the other load-carrier segment in order to be able to transfer the load carrier from the first state into a second state by at least sectionally rolling up the load-carrier segments in spiral form, wherein the load carrier can be transferred from the second state into the first state by unrolling, it is provided according to the invention that the load-carrier segments each have at least one cover plate, wherein the cover plates have grooved structures which form the upper sides of the load-carrier segments, wherein the cover plates are preferably produced by extrusion, that the load-carrier segments each have at least two carrier slats to which the at least one cover plate is fastened, in particular screwed tightly, wherein the carrier slats of the respective load-carrier segment extend in the second direction and are arranged parallel to one another, wherein in each case two of the carrier slats of the respective load-carrier segment are arranged one behind the other, as seen in the first direction, wherein the carrier slats are preferably produced by extrusion, and that the carrier slats of successive load-carrier segments are shaped in such a way that, in the first state of the load carrier, they overlap in sections in the first direction.

Typically, the load-carrier segments further extend with a segment height in the third direction.

Loading and unloading relates in particular to general piece goods, which includes both individual packages or individual items as well as grouped goods or palletized items.

The suitability for loading and unloading containers naturally also implies suitability for loading and unloading loading areas, in particular of vehicles such as trucks, or loading spaces, in particular of vehicles such as trucks.

Accordingly, here and in the following, such loading areas and loading spaces are always included when containers are referred to.

By making the load-carrier segments rigid—in contrast to a belt, for example—on the one hand an increased mechanical stability and robustness is achieved compared to solutions known from the prior art. On the other hand, the rigid load-carrier segments not only allow the load carrier to be pulled, in particular in order to pull it together with the cargo arranged thereon out of a container and thus unload the container, but also to press or push the load carrier in the opposite direction, in particular in order to push the load carrier together with the cargo arranged thereon into a container and thus load the container. Loading can also be carried out in such a way that piece goods are arranged on the load carrier while they are being pushed into the container.

In contrast to prior art push floors, which consist of individually longitudinally movable slats, the entire load carrier is moved at once when the container is unloaded by pulling on the load carrier and when it is loaded by pressing or pushing. Accordingly, unloading as well as loading with the load carrier takes place much faster than with known push floors. In addition, the transition to a further conveying system can be made more gently, since no shear forces act from the load carrier on the goods conveyed thereon when the load carrier is moved, because the load-carrier segments are not displaced against each other, in particular not in the first direction.

The upper sides of the load-carrier segments are opposite to bottom sides of the load-carrier segments, wherein the upper sides and bottom sides face away from each other. Like the first and second directions, the third direction is defined by the respective load-carrier segment and faces from the bottom side of the respective load-carrier segment to the upper side thereof, and in this sense the upper side faces in the third direction. However, this does not mean, for example, that the respective upper side must form a normal plane to the third direction. In particular, the upper sides do not have to be flat, but can have unevenness, for example in order to generate a better grip for the cargo.

In the first state of the load carrier, cargo can be arranged on the upper sides of the load-carrier segments. Typically, the upper sides—or the third direction—face at least with a directional component against the direction of gravity. In this sense, the load-carrier segments are typically pivoted "upwards" one after the other when rolled up.

The first state of the load carrier could also be referred to as an operating state or a state intended for loading (with cargo). The fact that the upper sides of the load-carrier segments are arranged substantially parallel to one another (and one behind the other as seen in the first direction) is to be understood as meaning that substantially all load-carrier segments of the load carrier are affected thereby. Minor deviations from said arrangement may result, for example, from technically unavoidable manufacturing reasons or from the arrangement of the load carrier in a specific container with specific space conditions. In the latter case in particular, it cannot be ruled out that, for example, a last and/or first load-carrier segment may not lie with its upper side completely parallel to the other load-carrier segments.

Here and in the following, "parallel" is always understood to include "antiparallel", unless explicitly stated otherwise.

Typically, the load carrier is dimensioned in such a way that its loading area extends over or can cover the entire area of the container/loading area of the vehicle/floor area of the vehicle's cargo space that can be used for loading.

The fact that the loading area formed by the load carrier in the first state is essentially flat is to be understood as meaning that the loading area extends in one plane, but that minor deviations are of course possible, which are technically unavoidable for manufacturing reasons, for example, or result from the arrangement of the load carrier in a specific container with specific space conditions. Apart from this, the top surface of the load-carrier segments need not be flat, as already explained above, which is why the surface of the loading area need not be flat.

The second state of the load carrier could also be referred to as a storage state, which enables an extremely space-saving accommodation of the load carrier, in particular at an unloading bay, which represents a further advantage over known solutions, such as push floors. In a cross-sectional plane normal to the second direction(s), the second state results, at least in sections, in a spiral or helical shape of the load carrier or, at least in sections, in a spiral/helical arrangement of the successive load-carrier segments.

In this case, the load carrier can be arranged in a spiral shape at least in sections in a storage unit suitably set up for this purpose, for example a storage cassette, in order to enable the load carrier to be accommodated in a protected manner in the second state. The storage unit can be provided or arranged accordingly at the unloading bay.

For the most space-saving storage of the load carrier, it can be provided that it is completely rolled up in a spiral manner in the second state, i.e. that the sequence of all load-carrier segments results in a spiral arrangement. Typically, however, not all load-carrier segments are rolled up or in a spiral arrangement in the second state, but the rolling up is stopped as soon as the load carrier is completely pulled out of the container, wherein usually at least a few load-carrier segments, including the last load-carrier segment, remain arranged substantially parallel to one another.

When the load carrier is transferred from the second state to the first state by unrolling, the load-carrier segments are clearly swung back in the opposite direction (compared to rolling up).

In a preferred embodiment of the load carrier according to the invention, it is provided that in the first state of the load carrier, the respective one of the load-carrier segments can be pivoted with its upper side in the direction of the upper side of the respective other load-carrier segment by a first pivoting angle which is at most 45°, preferably a maximum of 30°, and that, in the first state of the load carrier, the respective one of the load-carrier segments can be pivoted with its upper side away from the upper side of the respective other load-carrier segment by a second pivoting angle which is a maximum of 3°, preferably a maximum of 1°, particularly preferably 0°. This restriction of the range in which the load-carrier segments can be pivoted results in a particularly high stability of the load carrier both when unrolling or transferring from the second to the first state and when pressing or pushing the load carrier, in particular in order to push the load carrier together with the cargo arranged thereon into a container and thus to load the container.

In principle, it is sufficient for the back-and-forth transfer between the first and second states if the second pivoting angle is zero. However, a second pivoting angle slightly greater than 0° may prove favorable, as this allows a certain amount of play, making the load carrier somewhat more flexible and reliably preventing a tendency to jam when transferring back and forth between the first and second states.

The said restriction of the pivoting range can be achieved, for example, in a manner known per se by appropriately shaped pivoting links which are provided for the articulated connection of the load-carrier segments, wherein each load-carrier segment has a plurality of, preferably two, pivoting links which, as viewed in the second direction, can be arranged one behind the other. Accordingly, in a preferred embodiment of the load carrier according to the invention, it is provided that, for the articulated connection of the load-carrier segments, the load-carrier segments each have a plurality of, preferably two, pivoting links, wherein the pivoting links of two successive load-carrier segments pivotably engage in one another.

For strength reasons, the pivoting links are preferably made of steel, for example by laser cutting or milling.

As mentioned, the restriction of the pivoting range can be easily realized by suitable shaping of the pivoting links. Accordingly, in a particularly preferred embodiment of the load carrier according to the invention, it is provided that the magnitude of the first pivoting angle and the magnitude of the second pivoting angle are limited by positive locking of the interlocking pivoting links of successive load-carrier segments.

In the case of the load carrier according to the invention, it is provided that the load-carrier segments each have at least one cover plate, wherein the cover plates have grooved structures which form the upper sides of the load-carrier segments, wherein the cover plates are preferably produced by extrusion.

Several cover plates can be provided to form the upper side of the load-carrier segments, which can be arranged one behind the other, in particular when viewed in the second direction. Accordingly, upper sides of different sizes can be realized with cover plates of just a few sizes, in particular just one standard size, which can be produced simply and inexpensively.

The grooved structure proves to be favorable for holding the load on the load carrier. In addition, the grooved structure can be exploited for the gentlest possible transition to further conveying technology by interposing a transition piece that has a corresponding grooved structure that engages in the grooved structure of the load-carrier segments. This enables the transition piece to ride under the piece goods arranged on the cover plates in order to permit low-resistance, stepless sliding of the piece good onto the transition piece (or more precisely onto an upper side of the transition piece opposite the underside) and subsequently onto the continuing conveyor system.

The production of the cover plates by extrusion proves to be particularly advantageous with regard to the grooved structure, as expensive mechanical processing to produce the grooved structure can be omitted.

Manufacturing as many elements of the load carrier as possible by extrusion enables the load carrier to be constructed very economically. Here and in the following, "extrusion" is to be understood as a process which is not restricted to plastics but can also apply to metals in particular, although the term "extrusion molding" is also commonly used for metals.

When extrusion is mentioned here and in the following, the following materials in particular can be used for the production of the corresponding elements, which prove to be particularly favorable for the load carrier with regard to their mechanical, physical and chemical material properties and/or their economic efficiency: Aluminum alloys as known per se for extrusion (or for extrusion molding), such as EN AW-6060, EN AW-1050, EN AW-6082 or EN AW-5083.

For mechanically stable and at the same time structurally simple—and thus cost-effective—fastening of the cover plates, it is provided in the load carrier according to the invention that the load-carrier segments each have at least two carrier slats to which the at least one cover plate is fastened, in particular screwed tight, wherein the carrier slats of the respective load-carrier segment extend in the second direction and are arranged parallel to one another, wherein in each case two of the carrier slats of the respective load-carrier segment are arranged one behind the other as seen in the first direction, wherein preferably the carrier slats are produced by extrusion.

In the case of the load carrier according to the invention, it is provided that the carrier slats of successive load-carrier segments are shaped in such a way that they overlap in sections in the first direction in the first state of the load carrier.

This allows the carrier slats to be supported against each other in the overlapping area when, for example with heavy piece goods, a particularly high load acts on the load-carrier segments parallel to the third direction.

In addition, dirt between the load-carrier segments is prevented from falling through the load carrier in the first state and thus possibly contaminating a surface located under the load carrier, which can in particular be designed as a sliding surface, which could subsequently also lead to an obstruction of the movement of the load carrier on the (sliding) surface.

Preferably, the sectionally overlapping carrier slats engage loosely with one another so that a gap is formed between the carrier slats to ensure sufficient flexibility of the load carrier. In this case, under said high load, a certain sectional yielding of the involved load-carrier segments may occur until they support each other.

In order to enable the load carrier to be rolled up or unrolled in as exact or defined a manner as possible, it is provided in a preferred embodiment of the load carrier according to the invention that, in order to guide the load carrier during rolling up and unrolling, the load-carrier segments each have a plurality of, preferably two, guide links which, as viewed in the second direction, are arranged one behind the other, wherein preferably the guide links, as viewed parallel to the second direction, delimit the respective load-carrier segment outwardly at least in sections.

Clearly, the guide links are preferably designed in a substantially rigid manner, i.e., in particular, not as rollers.

For strength reasons, the guide links are preferably made of steel, for example by laser cutting or milling.

In accordance with the above, "parallel" is also to be understood in this case as "antiparallel", i.e. the guide links can close off or outwardly limit the respective load-carrier segment both when viewed in and against the second direction, at least in sections. As viewed in the second direction, the guide links are then arranged correspondingly in a start and end region of the respective load-carrier segment.

The guide links of the load-carrier segments can cooperate with corresponding guide means during rolling up or unrolling, or are designed for this cooperation. Suitable guide means include, for example, sliding guides known per se, which can be formed, for example, by appropriately shaped profiles, which profiles in turn can be constructed from suitable materials (comprising low-friction plastics) or can be coated with such materials. Another example of suitable guiding means would be roller guides known per se, wherein guide rollers are arranged in such a way that the desired spiral course of the load carrier is achieved.

Preferably, the guide means are provided in the storage unit.

In a particularly preferred embodiment of the load carrier according to the invention, it is provided that the guide links along the first direction have a contour that is curved at least in sections. This proves to be particularly advantageous with regard to particularly precise guidance, because the curved contour permits "planar" guidance on several guide rollers simultaneously or large sections of guide rails, in particular in the storage unit. A straight-line contour, on the other hand, would only result in contact with one guide roller or with a smaller contact area.

In order to enable trouble-free movement of the load carrier, it is provided in a preferred embodiment of the load carrier according to the invention that the load-carrier segments comprise a first load-carrier segment and a last load-carrier segment, wherein, as viewed in the first direction, the remaining load-carrier segments are arranged between the first load-carrier segment and the last load-carrier segment when the load carrier is in the first state, and that at least one first connecting element is provided in the region of the first load-carrier segment for connecting the load carrier to a pulling and pushing device. The pulling and pushing device serves for pulling the load carrier (or the load-carrier segments) in a pulling direction in order to pull it out of the container during unloading, and for pressing or pushing the load carrier (or the load-carrier segments) in a pushing direction opposite to the pulling direction in order to push it into the container during loading. Suitable first connecting elements are known per se and can include, for example, the most varied forms of hooks and eyelets.

In a particularly preferred embodiment of the load carrier according to the invention, it is provided that at least one wall element projects in the third direction in the region of the last load-carrier segment. The at least one wall element ensures that, during unloading, as little cargo as possible can slip off the load carrier against the pulling direction or against the first direction, as a result of which the container is unloaded as completely as possible.

In particular, the at least one wall element can be dimensioned in such a way that the cross-sectional area of the interior of the container or of the loading space of the transport vehicle is essentially completely covered. The at least one wall element thus completely prevents the piece goods from falling down during unloading, so that no goods remain in the container or loading space.

In accordance with the above, a system comprising a load carrier according to the invention is also provided, the system further comprising a pulling and pushing device for pulling the load carrier in a pulling direction out of a container and for pushing the load carrier in an opposite pushing direction into a container, wherein the pulling and pushing device has at least one second connecting element for connection to the load carrier, as well as a storage unit having guide means, in particular guide rollers, for rolling up the load carrier in order to store it at least in sections in the second state. It is understood that the guide means also guide the load carrier or the load-carrier segments during unrolling, i.e. during transfer of the load carrier from the second to the first state.

For example, the system can be permanently installed at a loading/unloading bay where trucks dock to load/unload their containers or holds or loading areas, or can be portable to be easily located at the unloading bay.

Suitable second connecting elements for connection to the load carrier or to at least one load-carrier segment of the load carrier are known per se, e.g. hooks, eyelets or clamps.

In particular, the second connecting element is designed to be connected or coupled to the first connecting element of the load carrier.

The guide means of the storage unit can be the guide means already described above, i.e. in particular profiles in which the load carrier, or more precisely the load-carrier segments, are guided in a sliding manner, or arrangements of guide rollers.

In particular, the guide means can be designed to cooperate with the guide links of the load-carrier segments.

The storage unit can be in the form of a cassette or drum, for example.

The pulling and pushing device can in particular comprise at least one electric motor to move the load carrier. In order to provide a structurally simple active connection between the pulling and pushing device on the one hand and the at least one second connecting element or the load carrier on the other hand, it is provided in a preferred embodiment of the system according to the invention that the at least one second connecting element is connected to a connecting piece, which connecting piece is movable by the pulling and pushing device and comprises a plurality of rigid connecting piece segments which are connected to one another in an articulated manner, substantially like the load-carrier segments of the load carrier, in order to be able to store the connecting piece together with at least one section of the load carrier in the second state in the storage unit. By constructing the connecting piece with its hingedly interconnected connecting piece segments substantially in the same manner as the load carrier with its load-carrier segments, a cost-effective manufacturing can be achieved. Furthermore, due to this construction, the connecting piece can act, as it were, as an extension of the load carrier beyond the first load-carrier segment and can be moved by the pulling and pushing device in exactly the same way in order to be rolled up in the storage unit or unrolled from the storage unit together with the load carrier. It would be conceivable for a length of the connecting piece segments in particular to differ—slightly—from the segment length of the load-carrier segments and, for example, to be 10 cm instead of 20 cm.

It would be conceivable, for example, that a kind of shaft of the pulling and pushing device is provided in the storage unit, which shaft can be driven by means of at least one motor, in particular an electric motor, in a first direction of rotation as well as in an opposite second direction of rotation, and that the connecting piece is fastened to the shaft by a first end region, wherein the first end region is opposite a second end region and the second connecting element is fastened in the second end region. Accordingly, upon rotation of the shaft in the first direction of rotation, the connecting piece and, subsequently, the load carrier connected to the connecting piece are spirally wound or coiled around the shaft, whereby the load carrier can be pulled out of the container by means of the connecting piece. Upon subsequent rotation of the shaft in the second direction of rotation, the load carrier and subsequently also the connecting piece are unrolled or unwound from the shaft, whereby the load carrier can be pushed or pressed into the container via the connecting piece.

In particular, a design restriction of the pivoting angle range of the connecting piece segments analogous to the restriction of the pivoting angle range of the load-carrier segments—in one direction a maximum of 45°, preferably a maximum of 30°, and in the opposite direction a maximum of 3°, preferably a maximum of 1°, particularly preferably 0°—can be provided to make pushing or pressing during unrolling particularly effective and safe.

In a preferred embodiment of the system according to the invention, it is provided that the pulling and pushing device comprises a friction wheel drive for moving the load carrier, which is arranged in front of the storage unit as seen in the pulling direction. This represents a particularly simple solution in terms of design, since the storage unit only has to be equipped with the guide means and no drive means of the pulling and pushing device have to be arranged in the storage unit.

The friction wheel drive clearly comprises at least one friction wheel, which is intended to press with a directional portion parallel/antiparallel to the third direction against the load-carrier segments or optionally against the connecting piece segments and to press these against a counter surface in order to build up sufficient friction so that the load carrier or optionally the connecting piece is moved when the friction wheel rotates. By reversing the direction of rotation of the friction wheel, the load carrier can thus be pulled out of the container as well as pushed into the container.

In a preferred embodiment of the system according to the invention, in order to be able to seamlessly convey the unloaded cargo, in particular piece goods, it is provided that a continuing conveyor is provided for conveying in a conveying plane which encloses an acute angle with the first direction of the load-carrier segments of the load carrier in the first state, wherein a transition piece is provided upstream of the continuing conveyor, which transition piece is arranged to slide with an underside on the upper side of the load-carrier segments, wherein preferably the underside of the transition piece has a grooved structure. The continuing conveyor can be designed in a manner known per se, for example as a belt conveyor.

The acute angle is typically in the range of 6° to 25°.

With regard to the transition piece, reference is made in principle to the explanations above. As already mentioned, the transition piece ensures low-resistance, stepless sliding of the load from the load carrier onto the continuing conveyor, with the cargo sliding off on an upper side of the transition piece opposite the lower side of the transition piece.

The upper side of the upstream transition piece may include an angle with the first direction of the load-carrier segments of the load carrier in the first state that is slightly shallower than the acute angle to make the transition even lower in resistance, e.g., an angle of about 10° with an acute angle of about 22°.

Preferably, the grooved structure of the transition piece and grooved structures of the cover plates interlock, i.e. the grooved structures are matched to one another for this purpose. This allows the transition piece to ride under the load arranged on the cover plate in order to make the transition from the load carrier to the transition piece as smooth and low-resistance as possible for the load.

By inclining the conveying level of the continuing conveyor to the loading area of the load carrier, the load or piece good can be quickly brought to a higher level, in particular higher than that of the unloading bay, in order to simplify continuing transport. At the same time, space can be gained at the level of the unloading bay to accommodate the pulling and pushing device and the storage unit.

Furthermore, in a particularly preferred embodiment of the load carrier or system according to the invention, it can be provided that, as viewed in the first direction, downstream of the at least one wall element, at least one slide-off plate is provided which extends obliquely from the wall element in the direction of the loading area, wherein the transition piece can pass under the slide-off plate at least in sections. This means that there is at least a small gap between the loading area (or the upper side of the load-carrier segments) and the slide-off plate. This gap can be covered, for example, by a spring-loaded flap which can be pivotably mounted on the slide-off plate and is arranged between the loading area and the slide-off plate. The flap is thus pressed away from the transition piece when the slide-off plate moves (in the pulling direction) towards the transition piece and comes sufficiently close to it. In this case, the transition piece is arranged with an initial area under the slide-off plate. Typically, a form fit prevents the transition piece from driving completely under the slide-off plate. In this way, all the piece goods can slide from the slide-off plate onto the transition piece and finally be moved onto the continuing conveyor.

BRIEF DESCRIPTION OF THE DRAWINGS

The invention will now be explained in more detail by means of an exemplary embodiment. The drawings are exemplary and are intended to illustrate the idea of the invention, but in no way to restrict it or even to reproduce it conclusively.

In the drawings.

DETAILED DESCRIPTION OF THE PREFERRED EMBODIMENTS

Figure 1:
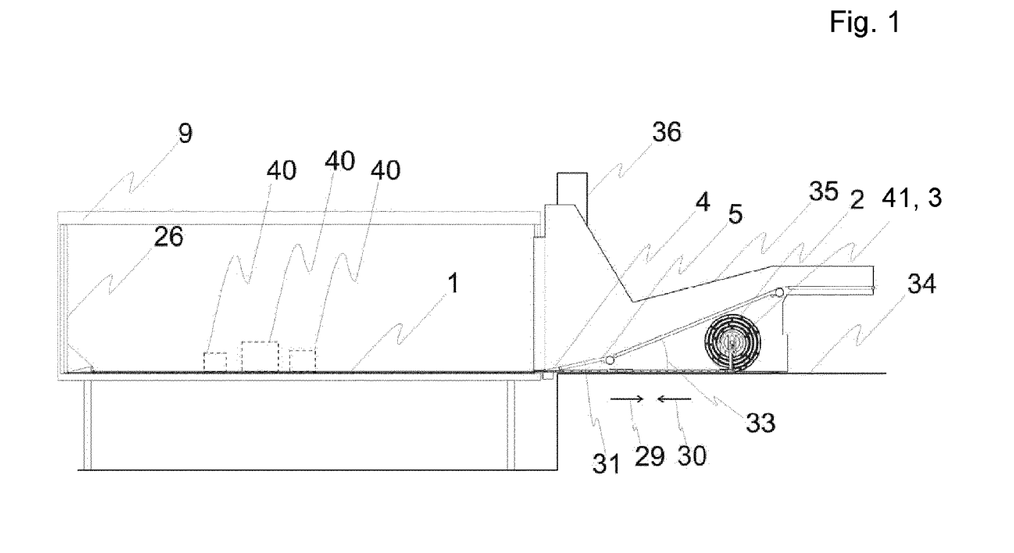
FIG. 1 shows a schematic sectional view of a system comprising a load carrier according to the invention for loading and unloading a container at a loading/unloading bay.

In the schematic sectional view of FIG. 1, a container 9 is shown at a loading/unloading bay 34, wherein a system according to the invention comprising an embodiment of a load carrier 1 according to the invention for loading and unloading the container 9 is recognizable. The load carrier 1 is in a first state and is arranged in the container 9 and covers the bottom thereof, with piece goods 40 (indicated by dashes) being arranged on the load carrier 1.

Figure 2:
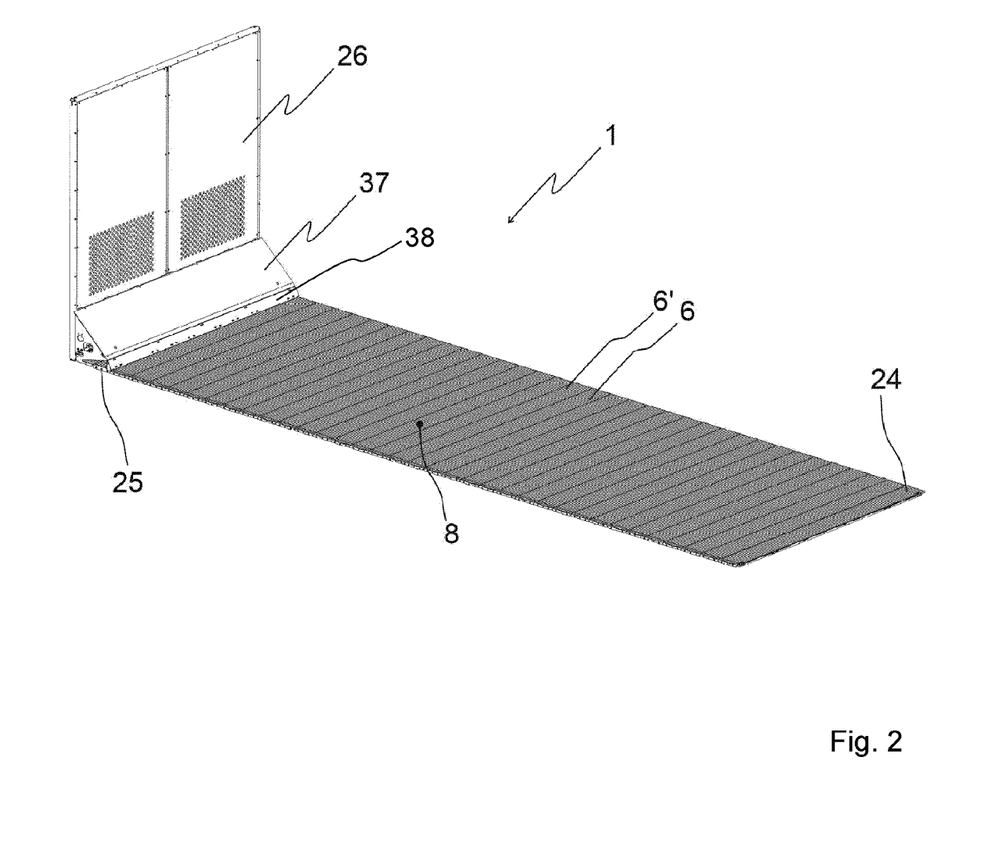
FIG. 2 shows a schematic axonometric view of the load carrier in a first state.
Figure 3:
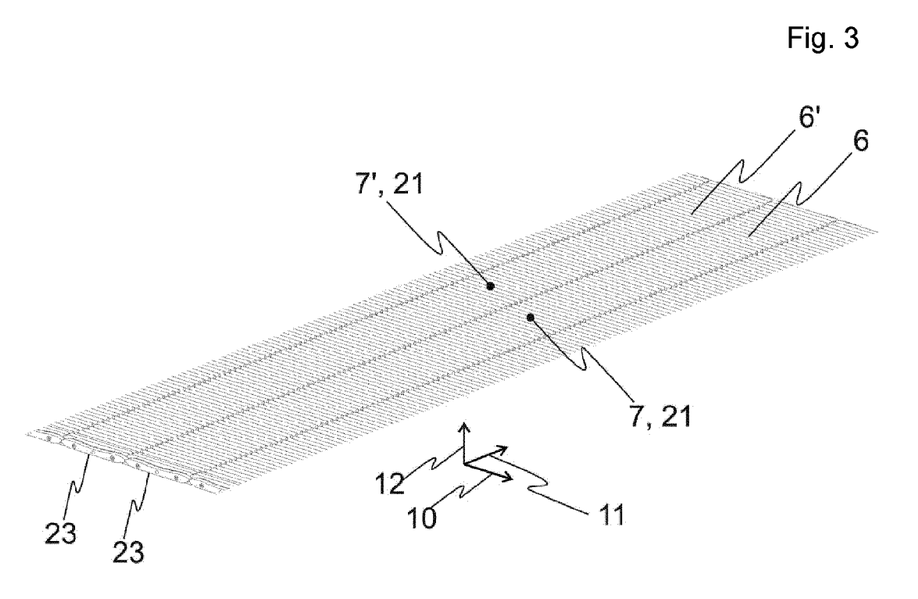
FIG. 3 shows a schematic axonometric detail view of several load-carrier segments of the load carrier according to FIG. 2.
Figure 4:
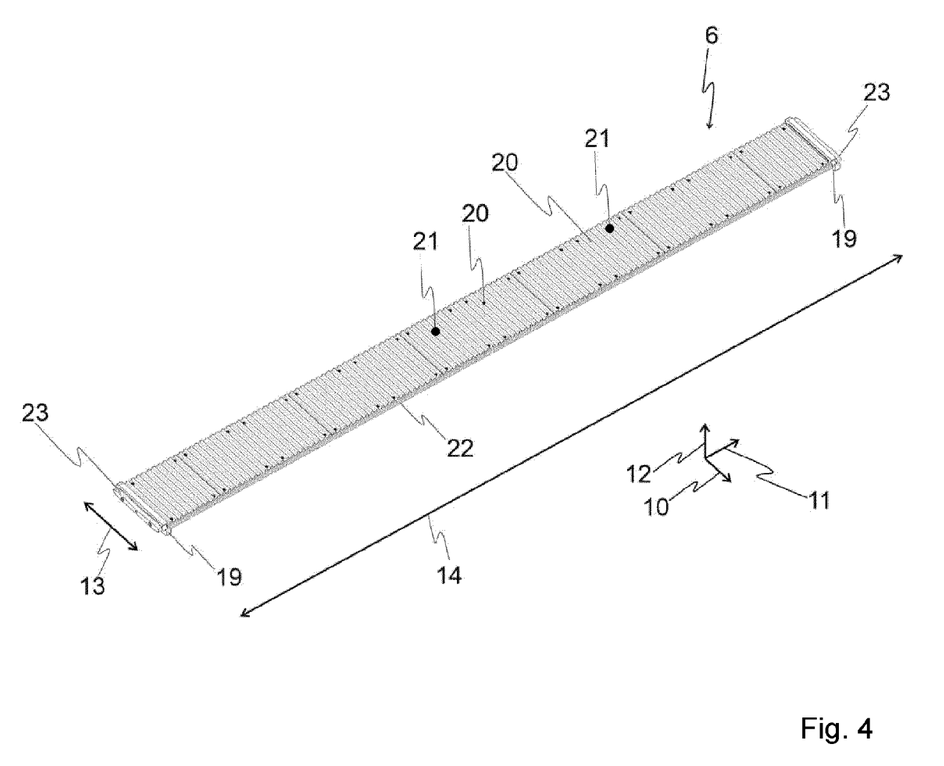
FIG. 4 shows a schematic axonometric detail view of a single load-carrier segment.

The load carrier 1, which is shown in FIG. 2 in an axonometric view, comprises rigid load-carrier segments 6, 6', which can be seen again in more detail in FIG. 3 and FIG. 4. The load-carrier segments 6, 6' each have an upper side 7, 7' facing in a third direction 12, on which the piece goods 40 can be arranged, as indicated in FIG. 1. The load-carrier segments 6, 6' extend with a segment length 13 in a first direction 10, with a segment width 14 in a second direction 11 and with a segment height 15, cf. FIG. 5, in the third direction 12. The first direction 10, the second direction 11 and the third direction 12 are mutually normal to one another. Typically, the segment length 13 is in a range of 0.1 m to 1 m (e.g. 0.2 m), the segment width 14 is in a range of 1 m to 5 m and the segment height 15 is in a range of 0.015 m to 0.1 m (e.g. 0.025 m).

In the first state of the load carrier 1, the upper sides 7, 7' of the load-carrier segments 6, 6' are arranged substantially parallel to one another and one behind the other as seen in the first direction 10 to form a substantially flat loading area 8. Clearly, the dimensions of the load carrier 1 may be matched to the dimensions of the container 9, such that the loading area 8 covers substantially the entire bottom of the container 9 and all of the piece goods 40 placed in the container 9 are arranged on or above the loading area 8 when the load carrier 1 is fully arranged in the container 9 in its first state.

In the first state, the load carrier 1 extends, as viewed against the first direction 10, from a first load-carrier segment 24 to a last load-carrier segment 25, between which the remaining load-carrier segments 6, 6' are arranged.

Figure 5:
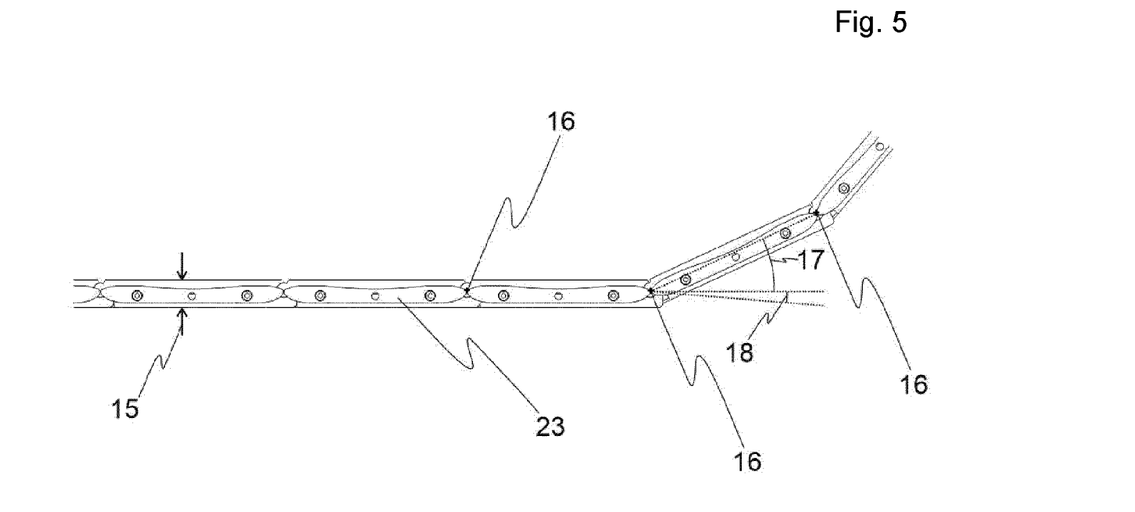
FIG. 5 shows a schematic side view of a plurality of load-carrier segments of the load carrier in a second state.

The load-carrier segments 6, 6' are connected to one another in an articulated manner in such a way that the load-carrier segments 6, 6' can be pivoted relative to one another about pivot axes 16 extending parallel to the second direction 11, cf. FIG. 5. In this context, in the first state, in each case one of the load-carrier segments 6, which, as viewed in the first direction 10, follows a respective other one of the load-carrier segments 6', can be pivoted with its upper side 7 in the direction of the upper side 7' of the other load-carrier segment 6', in order to be able to transfer the load carrier 1 from the first state into a second state by at least sectionally spirally rolling up the load-carrier segments 6, 6', wherein the load carrier 1 can be transferred from the second state into the first state by unrolling.

Accordingly, in the second state, the load carrier 1 can be stored or kept in a storage cassette 2, which is part of the system shown in FIG. 1, in a very space-saving manner.

During or due to the rolling up, the load carrier 1 can be pulled out of the container 9 in a pulling direction 29, whereby the container 9 is unloaded or the piece goods 40 are conveyed out of the container 9.

In order to ensure that, as far as possible, no piece goods 40 can slip off the load carrier 1 against the pulling direction 29 during unloading and that the container 9 is completely emptied, a wall element 26 is provided in the embodiment shown, which projects vertically in the third direction 12 from the last load-carrier segment 25. The wall element 26 is dimensioned in such a way that the cross-sectional area of the interior of the container 9 is completely covered, so that no piece goods 40 remain in the container 9 during unloading.

Figure 6:
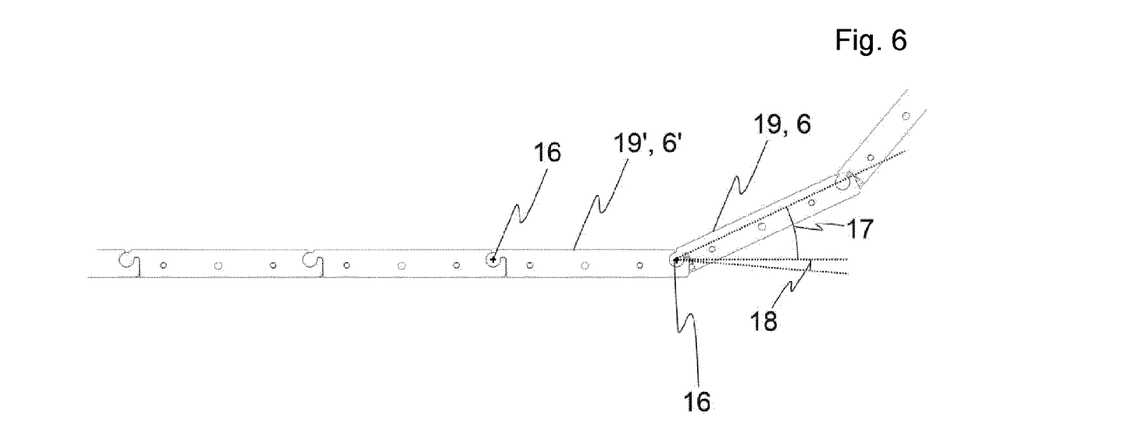
FIG. 6 shows a schematic side view analogous to FIG. 5, with guide links blanked out.

For articulated connection, the load-carrier segments 6, 6' in the illustrated exemplary embodiment each have two pivoting links 19, 19', wherein the pivoting links 19, 19' of two successive load-carrier segments 6, 6' pivotably engage in one another, cf. FIG. 6. The pivoting links 19, 19' are shaped in such a way that, in the first state of the load carrier 1, the respective one of the load-carrier segments 6 can be pivoted with its upper side 7 in the direction of the upper side 7' of the respective other load-carrier segment 6' by a first pivoting angle 17 ("upward"), which in the illustrated exemplary embodiment is at most 30°, and that, in the first state of the load carrier 1, in each case one of the load-carrier segments 6 can be pivoted with its upper side 7 away from the upper side 7' of the respective other load-carrier segment 6' by a second pivoting angle 18 ("downwards"), which in the exemplary embodiment shown is at most 3°. This means that the pivoting angle range is, or the pivoting angles 17, 18 are, limited by form fit of the pivoting links 19, 19', as a result of which the load carrier 1 can not only be pulled without difficulty in the pulling direction 29, but can also be pushed or pressed without difficulty in an opposite pushing direction 30, in order to push the load carrier 1 together with the piece goods 40 arranged thereon into the container 9 and thus to load the container 9.

As viewed in the second direction 11, the pivoting links 19 of the load-carrier segment 6 are arranged one behind the other and in opposite end regions of the load-carrier segment 6.

Figure 9:
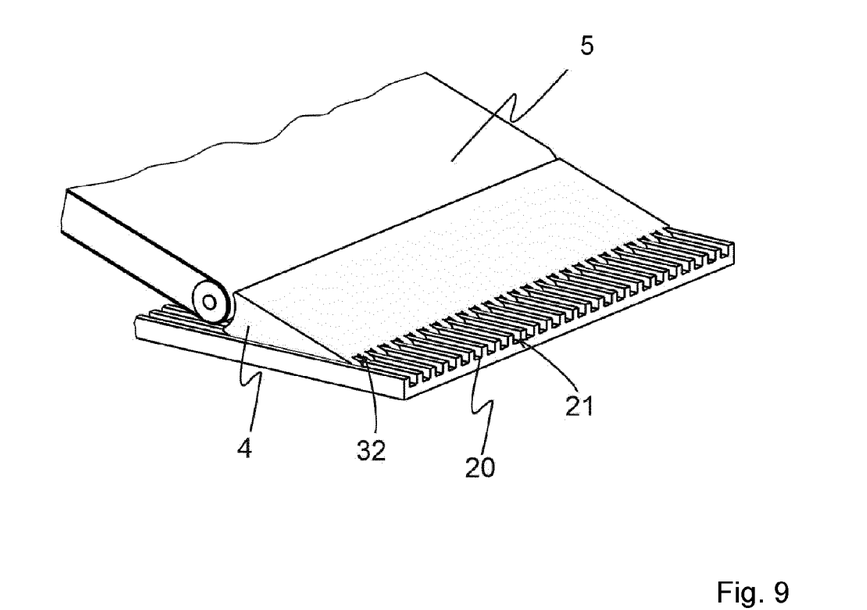
FIG. 9 shows a detailed axonometric view of a transition piece of the system of FIG. 1.

In the illustrated exemplary embodiment, the load-carrier segments 6, 6' each have a plurality of cover plates 20, which are arranged one behind the other as seen in the second direction 11. The cover plates 20 are each provided with a grooved structure 21 and thus form the upper sides 7, 7'. The grooved structure 21 proves to be favorable for holding the piece goods 40 on the load carrier 1. Furthermore, the grooved structure 21 in the illustrated exemplary embodiment is utilized for the gentlest possible transition to a continuing conveyor 5 of the system according to the invention, in that a transition piece 4 of the system is interposed, which has a corresponding grooved structure 32 on an underside 31, which engages in the grooved structure 21 of the load-carrier segments 6, 6', cf. FIG. 1 and FIG. 9. This allows the transition piece 4 to underrun the piece goods 40 arranged on the cover plates 20, in order to enable low-resistance, stepless sliding of the piece goods 40 onto the transition piece 4 (more precisely onto an upper side of the transition piece 4 opposite the underside 31) and subsequently onto the continuing conveyor 5. The continuing conveyor 5, which in the illustrated exemplary embodiment is designed as a belt conveyor, is provided for conveying in a conveying plane which encloses an acute angle 33 (in the illustrated exemplary embodiment approximately 22°) with the first direction 10 of the load-carrier segments 6, 6' of the load carrier 1 in the first state or with the pulling direction 29. This inclination allows the piece goods 40 to be quickly brought to a higher level, higher than that of the loading/unloading bay 34, in order to facilitate further transport.

In the illustrated embodiment of the load carrier or system according to the invention, as seen in the first direction 10, a slide-off plate 37 is provided downstream of the wall element 26 and extends obliquely from the wall element 26 in the direction of the loading area 8. However, the slide-off plate 37 does not end on the loading area 8 (or the upper side 7 of a load-carrier segment 6), but already somewhat above the latter. This means that there is a small gap between the loading area 8 and the slide-off plate 37, as a result of which the slide-off plate 37 can be driven under in sections by the transition piece 4. In the illustrated exemplary embodiment, this gap is covered by a spring-loaded flap 38, which is pivotably mounted on the slide-off plate 37 and is arranged between the loading area 8 and the slide-off plate 37. The flap 38 is thus pressed away from the transition piece 4 when the slide-off plate 37 moves in the pulling direction 29 towards the transition piece 4 and comes sufficiently close to it so that the transition piece 4 contacts the flap 38. In this case, the transition piece 4 is arranged with an initial area under the slide-off plate 37, wherein a form fit prevents the slide-off plate 37 from being completely driven under by the transition piece 4. Thus, all piece goods 40 can slide onto the transition piece 4 and finally be moved onto the continuing conveyor 5.

In the illustrated exemplary embodiment, the cover plates 20 are fastened to carrier slats 22 by bolting, with the cover plates 20 being arranged behind the carrier slats 22 as viewed in the third direction 12. Each load-carrier segment 6, 6' has exactly two carrier slats 22 which extend in the second direction 11 and are arranged parallel to one another. The two carrier slats 22 of the respective load-carrier segment 6, 6' are arranged one behind the other, as seen in the first direction 10.

Figure 7:
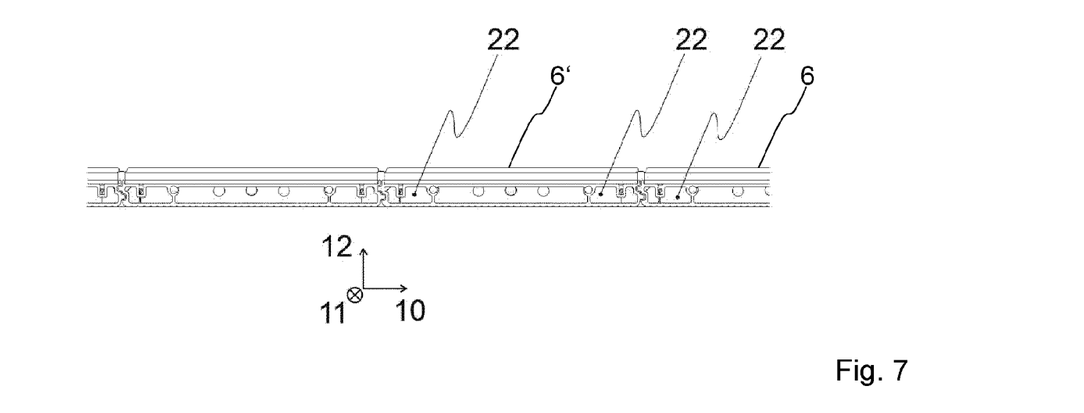
FIG. 7 shows a schematic sectional view of a plurality of load-carrier segments of the load carrier in the first state.

In FIG. 7, it can be seen that the carrier slats 22 of successive load-carrier segments 6, 6' are shaped in such a way that they overlap in sections in the first direction 10 in the first state of the load carrier 1. Among other things, this enables the carrier slats 22 to be supported against one another in the overlapping region if, for example in the case of heavy piece goods 40, a particularly high load acts on the load-carrier segments 6, 6' parallel to the third direction 12.

In FIG. 4 and FIG. 5, it can be seen particularly clearly that in the illustrated exemplary embodiment, the load-carrier segments 6, 6' each have two guide links 23 which serve to guide the load carrier 1 during rolling and unrolling. As viewed in the second direction 11, the guide links 23 of the respective load-carrier segment 6, 6' are arranged one behind the other and in mutually opposite end regions of the load-carrier segment 6, 6', wherein they delimit the respective load-carrier segment 6, 6' outwardly.

Figure 8:
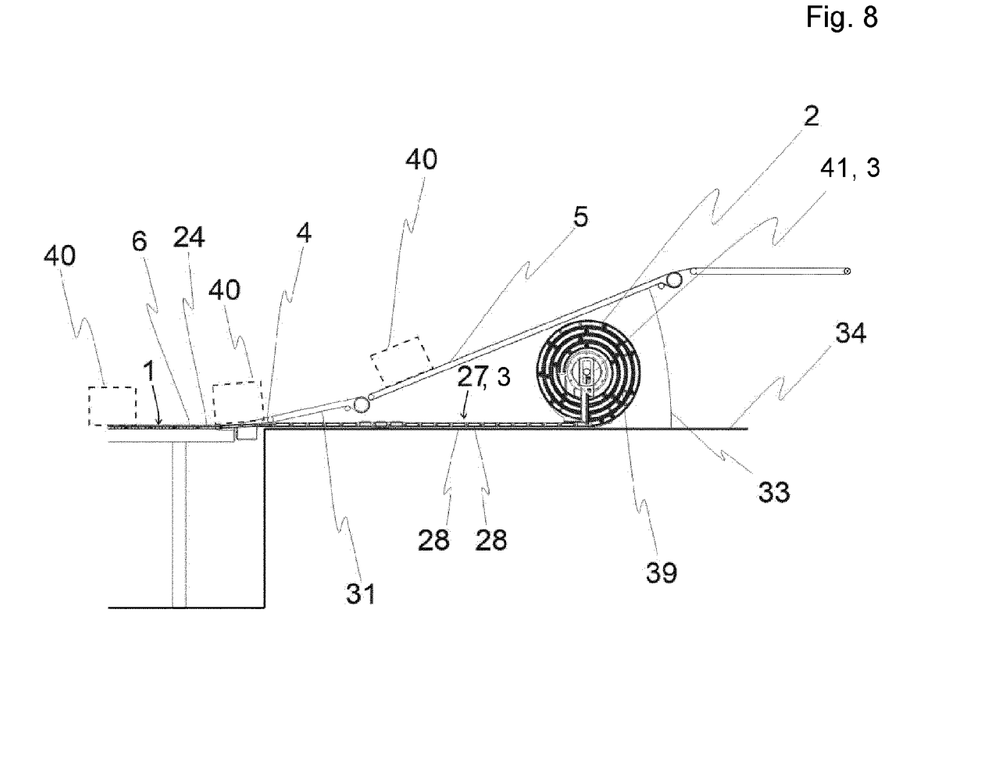
FIG. 8 shows an enlarged sectional view of the system of FIG. 1.

The guide links 23 are provided for cooperation with spirally extending guide profiles 39 in the storage cassette 2 acting as sliding guides, cf. FIG. 8. The guide links 23 have a curved contour along the first direction 10, cf. FIG. 5. The latter proves to be particularly advantageous with regard to especially precise guidance, because the curved contour permits "planar" guidance, simultaneously on large sections of the guide profiles 39 (or with large contact surfaces).

In the illustrated exemplary embodiment, the guide links 23 as well as the pivoting links 19, 19' are made of steel (e.g. by laser cutting or milling), whereas the cover plates 20 and the carrier slats 22 are made of an aluminum alloy by extrusion.

In the illustrated exemplary embodiment, the system comprises a pulling and pushing device 3 for pulling the load carrier 1 in the pulling direction 29 out of the container 9 and for pushing the load carrier 1 in the pushing direction 30 into the container 9.

For connection to the pulling and pushing device 3, the load carrier 1 has at least one first connecting element in the region of the first load-carrier segment 24, which may comprise hooks or eyelets (not shown), for example. The pulling and pushing device 3 correspondingly has at least one matching second connecting element, which may comprise, for example, eyelets or hooks (not shown), wherein the first and second connecting elements can be coupled to one another. In the illustrated exemplary embodiment, the at least one second connecting element is connected to and arranged on a connecting piece 27 of the pulling and pushing device 3. Accordingly, the connecting piece 27 can be moved by the pulling and pushing device 3 and comprises a plurality of rigid connecting piece segments 28 which are constructed substantially like the load-carrier segments 6, 6' of the load carrier 1 and are connected to one another in an articulated manner in order to be able to store the connecting piece 27 together with at least a portion of the load carrier 1 in the second state in the storage unit 2. In particular, in the illustrated exemplary embodiment, the connecting piece 27 has a design restriction of the pivoting angle range of the connecting piece segments 28 analogous to the restriction of the pivoting angle range of the load-carrier segments 6, 6', in order to make pushing or pressing during unrolling particularly effective and safe: 30° in one (pivoting) direction and 3° in the other (pivoting) direction.

In the illustrated exemplary embodiment, the pulling and pushing device 3 comprises a shaft 41 centrally arranged in the storage cassette 2, which is drivable by means of an electric motor (not shown), in a first direction of rotation as well as in an opposite second direction of rotation. The connecting piece 27 is secured to the shaft 41 by a first end portion, the first end portion being opposite a second end portion and the second connecting element being fastened in the second end portion, i.e., the second end portion adjoins the first load-carrier segment 24. Upon rotation of the shaft 41 in the first direction of rotation (counterclockwise in FIG. 1 and FIG. 8), the connecting piece 27 and, subsequently, the load carrier 1 connected to the connecting piece 27 are correspondingly spirally rolled up or wound up around the shaft 41 according to the guide profiles 39, whereby the load carrier 1 can be pulled out of the container 9 by means of the connecting piece 27. With subsequent rotation of the shaft 41 in the second direction of rotation (clockwise in FIG. 1 and FIG. 8), the load carrier 1 and subsequently also the connecting piece 27 are unwound from the shaft 41 accordingly, whereby the load carrier 1 can be pushed or pressed into the container 9 via the connecting piece 27.

In the exemplary embodiment shown, the storage cassette 2 is combined with the pulling and pushing device 3 including the connecting piece 27 as well as with the continuing conveyor 5 and the transition piece 4 in a portable loading/unloading unit 35. The storage cassette 2 is arranged under the continuing conveyor 5 to save space. A housing of the loading/unloading unit 35 protects the individual components against external influences. The loading/unloading unit 35 can be guided to and arranged at a gate 36 of the loading/unloading bay 34 as required in order to load or unload containers 9 at the loading/unloading bay 34. It is understood, however, that a permanent installation of the loading/unloading unit 35 at the loading/unloading bay 34 would also be conceivable.

LIST OF REFERENCE SIGNS

1 Load carrier
2 Storage cassette
3 Pulling and pushing device
4 Transition piece
5 Transition piece
6, 6' Load-carrier segment
7, 7' Upper side of the load-carrier segment
8 Loading area
9 Container
10 First direction
11 Second direction
12 Third direction
13 Segment length
14 Segment width
15 Segment height
16 Pivot axis
17 First pivoting angle
18 Second pivoting angle
19, 19' Pivoting link
20 Cover plate
21 Grooved structure of the cover plate
22 Carrier slat
23 Guide link
24 First load-carrier segment
25 Last load-carrier segment 26 Wall element
27 Connecting piece
28 Connecting piece segment
29 Pulling direction
30 Pushing direction
31 Underside of the transition piece
32 Grooved structure of the transition piece
33 Angle
34 Loading/unloading bay
35 Loading/unloading unit
36 Gate
37 Slide-off plate
38 Spring-loaded flap
39 Guide profile
40 Piece goods
41 Shaft

The invention claimed is:

1. A load carrier for loading and unloading a container, comprising rigid load-carrier segments,
   wherein the load-carrier segments each have an upper side facing in a third direction and a segment length extending in a first direction and a segment width extending in a second direction, wherein the first direction, the second direction and the third direction are disposed mutually normal to one another,
   wherein, in a first state of the load carrier, the upper sides of the load-carrier segments are arranged substantially parallel to one another and, as seen in the first direction, one behind the other in order to form a substantially planar loading area,
   wherein the load-carrier segments are connected to one another in an articulated manner such that the load-carrier segments can be pivoted in relation to one another about pivot axes extending parallel to the second direction, wherein, in the first state, a respective one of the load-carrier segments, which, as viewed in the first direction, follows a respectively other one of the load-carrier segments, can be pivoted with its upper side in the direction of the upper side of the other load-carrier segment in order to be able to transfer the load carrier from the first state into a second state by at least sectionally rolling up the load-carrier segments in spiral form,
   wherein the load carrier can be transferred from the second state into the first state by unrolling,
   wherein the load-carrier segments each have at least one cover plate,
   wherein the cover plates have grooved structures which form the upper sides of the load-carrier segments,
   wherein the load-carrier segments each have at least two carrier slats to which the at least one cover plate is fastened, in particular screwed tightly, wherein the carrier slats of the respective load-carrier segment extend in the second direction and are arranged parallel to one another, wherein in each case two of the carrier slats of the respective load-carrier segment are arranged one behind the other, as seen in the first direction,
   and wherein the carrier slats of successive load-carrier segments are shaped in such a way that, in the first state of the load carrier, they overlap in sections in the first direction.

2. The load carrier according to claim 1, wherein, in the first state of the load carrier, the respective one of the load-carrier segments can be pivoted with its upper side in the direction of the upper side of the respective other load-carrier segment by a first pivoting angle which is at most 45°, and wherein, in the first state of the load carrier, the respective one of the load-carrier segments can be pivoted with its upper side away from the upper side of the respective other load-carrier segment by a second pivoting angle which is a maximum of 3°.

3. The load carrier according to claim 1, wherein, for the articulated connection of the load-carrier segments, the load-carrier segments each have a plurality of pivoting links, wherein the pivoting links of two successive load-carrier segments pivotably engage in one another.

4. The load carrier according to according to claim 2, wherein the magnitude of the first pivoting angle and the magnitude of the second pivoting angle are limited by positive locking of the interlocking pivoting links of successive load-carrier segments.

5. The load carrier according to claim 1, wherein, in order to guide the load carrier during rolling up and unrolling, the load-carrier segments each have a plurality of guide links which, as viewed in the second direction, are arranged one behind the other.

6. The load carrier according to claim 5, wherein the guide links along the first direction have a contour that is curved at least in sections.

7. The load carrier according to claim 1, wherein the load-carrier segments comprise a first load-carrier segment and a last load-carrier segment, wherein, as viewed in the first direction, the remaining load-carrier segments are arranged between the first load-carrier segment and the last load-carrier segment when the load carrier is in the first state, and wherein at least one first connecting element is provided in the region of the first load-carrier segment for connecting the load carrier to a pulling and pushing device.

8. The load carrier according to claim 7, wherein at least one wall element projecting in the third direction is provided in the region of the last load-carrier segment.

9. A system comprising the load carrier according to claim 1 and a pulling and pushing device for pulling the load carrier in a pulling direction out of a container and for pushing the load carrier in an opposite pushing direction into a container, wherein the pulling and pushing device has at least one second connecting element for connection to the load carrier, as well as a storage unit having guide means, in particular guide rollers, for rolling up the load carrier in order to store it at least in sections in the second state.

10. The system according to claim 9, wherein the at least one second connecting element is connected to a connecting piece, which connecting piece is movable by the pulling and pushing device and comprises a plurality of rigid connecting piece segments which are connected to one another in an articulated manner, substantially like the load-carrier segments of the load carrier, in order to be able to store the connecting piece together with at least one section of the load carrier in the second state in the storage unit.

11. The system according to claim 9, wherein the pulling and pushing device comprises a friction wheel drive for moving the load carrier, which is arranged in front of the storage unit as seen in the pulling direction.

12. The system according to claim 9, wherein a continuing conveyor is provided for conveying in a conveying plane which encloses an acute angle with the first direction of the load-carrier segments of the load carrier in the first state, wherein a transition piece is provided upstream of the continuing conveyor, which transition piece is arranged to slide with an underside on the upper side of the load-carrier segments.

13. The load carrier according to claim 1, wherein the cover plates are produced by extrusion.

14. The load carrier according to claim 1, wherein the carrier slats are produced by extrusion.

15. The load carrier according to claim 5, wherein the guide links as viewed in parallel to the second direction delimit the respective load-carrier segment outwardly at least in sections.

* * * * *